(12) United States Patent
Bartfeld et al.

(10) Patent No.: US 7,647,617 B2
(45) Date of Patent: Jan. 12, 2010

(54) METHOD FOR ASSOCIATION BETWEEN TELEPHONY AND TELEVISION NETWORK EQUIPMENT

(75) Inventors: Eyal Bartfeld, Lexington, MA (US); Giora Keinan, Rishon LeZion (IL); Nimrod Gal-Oz, Lehavim (IL)

(73) Assignee: Integra5 Communications, Inc., Woburn, MA (US)

( * ) Notice: Subject to any disclaimer, the term of this patent is extended or adjusted under 35 U.S.C. 154(b) by 947 days.

(21) Appl. No.: 10/904,552

(22) Filed: Nov. 16, 2004

(65) Prior Publication Data

US 2006/0107299 A1    May 18, 2006

(51) Int. Cl.
*H04N 7/173* (2006.01)
*H04N 7/16* (2006.01)

(52) U.S. Cl. .................................... 725/122; 725/30

(58) Field of Classification Search .................. 725/62, 725/122, 11, 30, 131–133, 139–141, 151–153; 379/142.16, 90.01, 93.02–93.07, 93.23, 102.01–102.03, 379/207.02, 207.11, 88.13, 88.17, 88.18; 445/344, 410, 411, 414.1–415, 556.1, 556.2
See application file for complete search history.

(56) References Cited

U.S. PATENT DOCUMENTS

| | | | |
|---|---|---|---|
| 5,952,934 A * | 9/1999 | Matsumoto et al. .... 340/825.52 |
| 6,219,355 B1 * | 4/2001 | Brodigan .................... 370/486 |
| 6,286,141 B1 * | 9/2001 | Browne et al. ................ 725/39 |
| 6,457,177 B1 | 9/2002 | Reams |
| 6,543,052 B1 | 4/2003 | Ogasawara |
| 6,553,100 B1 | 4/2003 | Chen et al. |
| 6,665,375 B1 | 12/2003 | Forlenza et al. |
| 6,831,969 B2 * | 12/2004 | Ju ......................... 379/142.16 |
| 6,879,582 B1 | 4/2005 | Dhara et al. |
| 6,971,120 B1 | 11/2005 | Sheekookian |
| 2003/0033605 A1 * | 2/2003 | Bartfeld ..................... 725/109 |
| 2003/0048380 A1 * | 3/2003 | Tamura ...................... 348/552 |
| 2003/0086432 A1 * | 5/2003 | Bartfeld et al. ............. 370/401 |
| 2004/0034873 A1 * | 2/2004 | Zenoni ....................... 725/135 |
| 2004/0192206 A1 * | 9/2004 | Hirvonen ................... 455/41.2 |

* cited by examiner

*Primary Examiner*—Andrew Y Koenig
*Assistant Examiner*—Jason Thomas
(74) *Attorney, Agent, or Firm*—Sonia K. Guterman; Lawson & Weitzen, LLP

(57) ABSTRACT

A method for user assisted association between a television and a telephony device is provided. A set-top box requests an identification code from a server. The server identifies the set-top box, generates the code and transmits it to the set-top box. The set-top box displays the code and a user transmits the code back to the server via a telephony device. The server identifies the telephony device, and using the code, associates between the set-top box and the telephony device.

40 Claims, 3 Drawing Sheets

METHOD FOR ASSOCIATION BETWEEN TELEPHONY AND TELEVISION NETWORK EQUIPMENT

FIELD OF THE INVENTION

This invention relates generally to television/telephony networks, and more particularly to a method for automatic matching between telephony equipment and television network equipment such as set-top boxes.

BACKGROUND OF THE INVENTION

Television distribution networks are offering more and more services such as data, messaging and telephony. Similarly, telephony networks offer television services. It is desirable to provide integration between the services of both telephony and television. Examples of services that are enabled by having such integration are caller identification (Caller ID, or CID) on television, utilizing a television for call management of telephone calls, voicemail, and the like. These services benefit from the large display format offered by a television screen. Delivery of multiple services on a single network is commonly accomplished by utilizing different interface equipment between the distribution network and the different types of service. For example, in a television distribution network television services require a converter or receiver commonly referred to as a Set-Top Box (STB). Telephony service in such network are most often accomplished by a Media Terminal Adapter (MTA) which is commonly embedded within a cable modem, however other equipment may also be used such as computers or other telephony to cable interface equipment. Similarly, a telephony network that supplies television services accomplishes this task by utilizing telephones and separate interface devices for video and/or data. Some distribution networks may provide a variety of services over a converged, often IP-based, network where separation of services occurs at a central home gateway device.

Yet another example of the convergence between different services is the case of separate networks that are cross linked. Thus for example a cellular network provider may link services with a television provider for example in order to display voice message arrival or in some cases caller ID services using a television screen.

For clarity, the present invention will be described in terms of a television distribution network, but those skilled in the art will recognize the applicability of the present invention to telephony networks, as both are used as a television distribution networks with the main distinction being their 'traditional' role prior to integrating other services. Therefore the invention should be construed as extending to any distribution network that is adapted to carry television and telephony signals, as well as to a plurality of networks, where associations of television and different communication devices and/or interfaces is desired.

As this application will utilize a cable television network example for clarity, the term set-top box (STB for short) will be used hereinafter to denote any addressable interface between a television or video capable network and a television or a video display device. Thus for example the set-top box may be a cellular device, wireless device, satellite enabled device, and the like, coupled to, or embedded within, a device capable of displaying video signals. The term MTA will be used hereinafter to denote any addressable interface between a network that is adapted to carry telephony signals and a telephony device. An MTA may be embedded in other devices such as a cable modem, and in some cases even within the telephony device, for example within an IP enabled telephone, cellular telephones, or PBX (Private Branch exchange). The telephony network, the data network, and the television network may be the same network, or different networks each combining one or more of the services. Those networks extend to the like of cable, wireless, telephony network, cellular network, and the like. Telephony devices may be individual telephones, cellular telephones, cable modems, satellite phones, IP telephones, PBX systems, and the like.

Each set-top box and an MTA is individually addressable. Each user may have one or more set-top boxes that need to be associated with a corresponding user MTA. Network operators oftentimes meet difficulties in associating the different interfaces associated with individual users. Such association is done either manually or by programming that oftentimes needs to interface two separate software systems, at significant programming effort. If one of the systems changes, the programming needs to change as well, with additional expenses and with the risk of interrupted service. Even for networks utilizing a central home gateway devices, it is desired to identify the addresses of various end-user interfaces and to be able to associate between different devices, as these devices may be replaced due to failure or may be purchased individually by the end user. This information is not always readily available to the service providers. The present invention is directed to overcoming those difficulties.

SUMMARY OF THE INVENTION

In its broadest form, the present invention therefore provides a method of association between a television and telephony device, and/or other communication devices in a user premises. Therefore, there is provided a method for user assisted association between a television and a telephony device. The method comprising the steps of sending a code request from an addressable set-top box located at a user premises. In a server, identifying the set-top box address; generating a code; associating the code with the set-top address; and transmitting the code back to the set-top box. The set-top box displays the code either directly or preferably on a television screen if available. Using a telephony device having an address associated therewith, the code is transmitted by a user, to the server. The server identifies the telephony device address (either automatically or manually), and using the code, associates the telephony device with the set-top box.

The telephony device may be a private branch exchange, a central home gateway device, or an Internet Protocol telephone device. However, preferably, the telephony device is a telephone, or a cellular telephone. In some cases the telephony device may be an MTA, optionally embedded within a cable modem. The telephony device and the set-top box may be coupled to a single distribution network, or to a plurality of distribution networks. Examples of the distribution networks include a telephone network, an electrical distribution network, a data distribution network, a cable television distribution network, a wireless distribution network, a cellular distribution network, a satellite distribution network, a terrestrial distribution network, and the like.

Preferably identifying the telephone number is carried out automatically, and more preferably using a telephone caller identification method (e.g. caller ID). The address of the telephony device may be a telephone number, or another address such as a MAC (Media Access Code) address of a cable modem.

Optionally, the set-top box may be embedded in a wireless device. By way of example, the set-top box may be satellite television enabled, terrestrial radio enabled, or cellular communication enabled. To aid in identifying, the set top box may send its own address with the code request or the server may identify the set-top box automatically such as by its MAC address.

Preferably, the set-top box is equipped with a software agent adapted to perform the steps of sending, receiving and displaying.

In another aspect of the present invention there is provided a method for user assisted association between a television and a telephony device comprising the steps of: at a server, receiving a code request from a set-top box having an address, identifying the set-top box address, associating the code with the set-top box address, sending a code to the set-top box, for displaying the code to a user, receiving the code from a telephony device having, an address associated therewith, identifying the telephony device address, and using the code, associating the address of the set-top box with the address of the telephony device.

In yet another aspect of the invention, there is provided a method for user assisted association between a television and a telephony device, the method comprising the steps of sending code request from an addressable set-top box, receiving a code from a server, displaying the code to a user, and having a user to transmit the code utilizing an telephony device having an address associated therewith, for associating the set-top box with the telephony device.

SHORT DESCRIPTION OF DRAWINGS

The invention will be better understood with the aid of the accompanying drawings in which.

DETAILED DESCRIPTION

Figure 1:
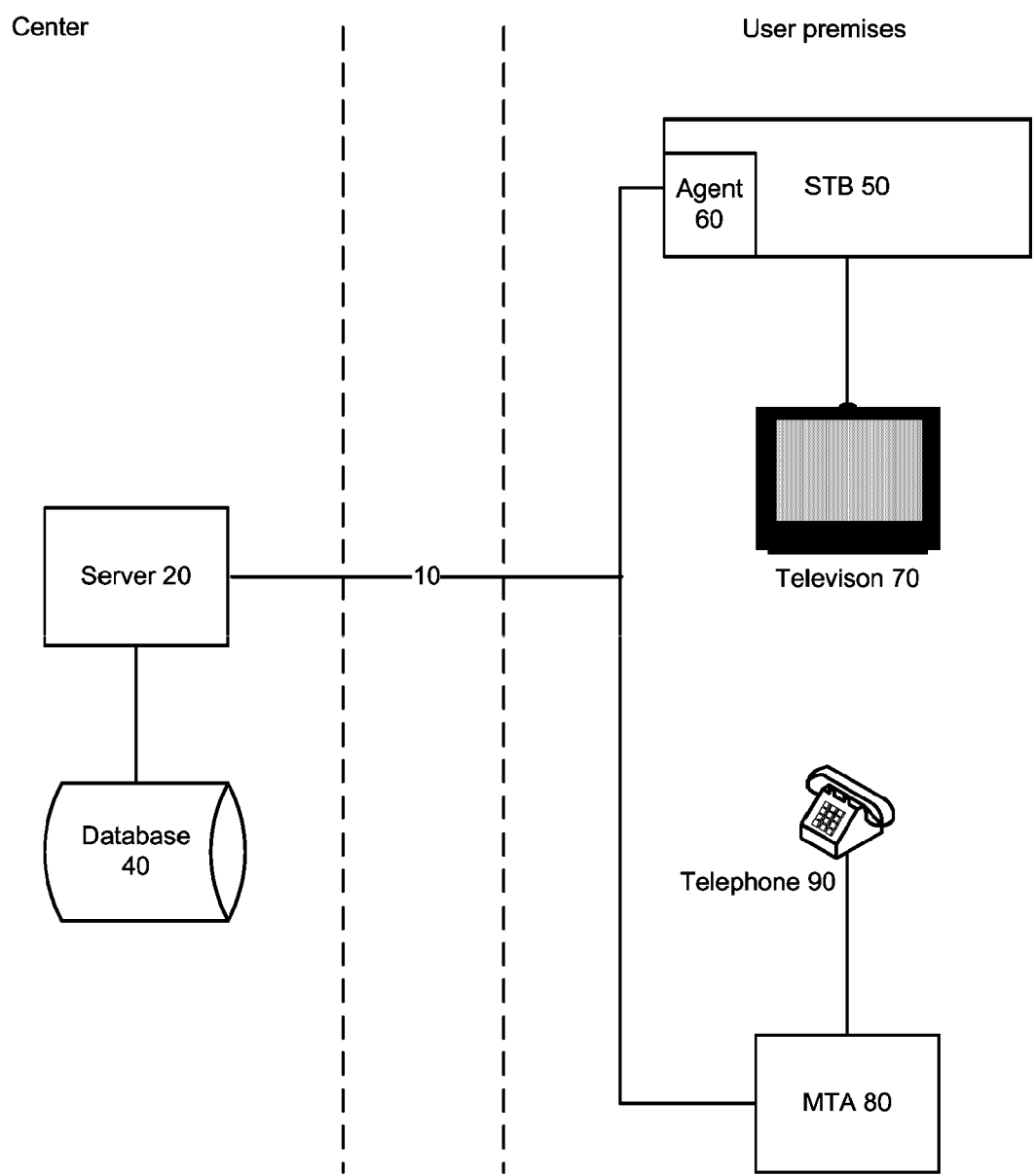
FIG. 1 depicts a typical system appropriate for operation of the invention.

FIG. 1 depicts a typical system in which the invention operates. A central location (e.g. a head-end) contains a server 20 and a database. The database is configured to contain at least pairs of Telephone addresses and STB addresses. The center is coupled to the network 10, directly or indirectly. A plurality of networks of different types may be utilized.

The user premises contain at least a television interface, such as STB 50, and an MTA 80. The STB is coupled to a television 70 and the MTA is coupled to a telephone 90.

An agent software 60 is provided in the STB 50. The agent may be supplied with the STB, or may be downloaded to it as desired. Downloading can be done to every STB in the network, or may be done selectively such as for new installations, by geographic area, as part of a special sale, and the like.

The agent software 60 may be activated automatically and/or by the user, such as by selecting the function from a menu. If desired, the agent software may also be downloaded on demand after a user action. The agent software may be activated automatically on power-up of the STB. Alternatively, a network operator may download an agent to the STB to advertise the services offered.

Figure 2:
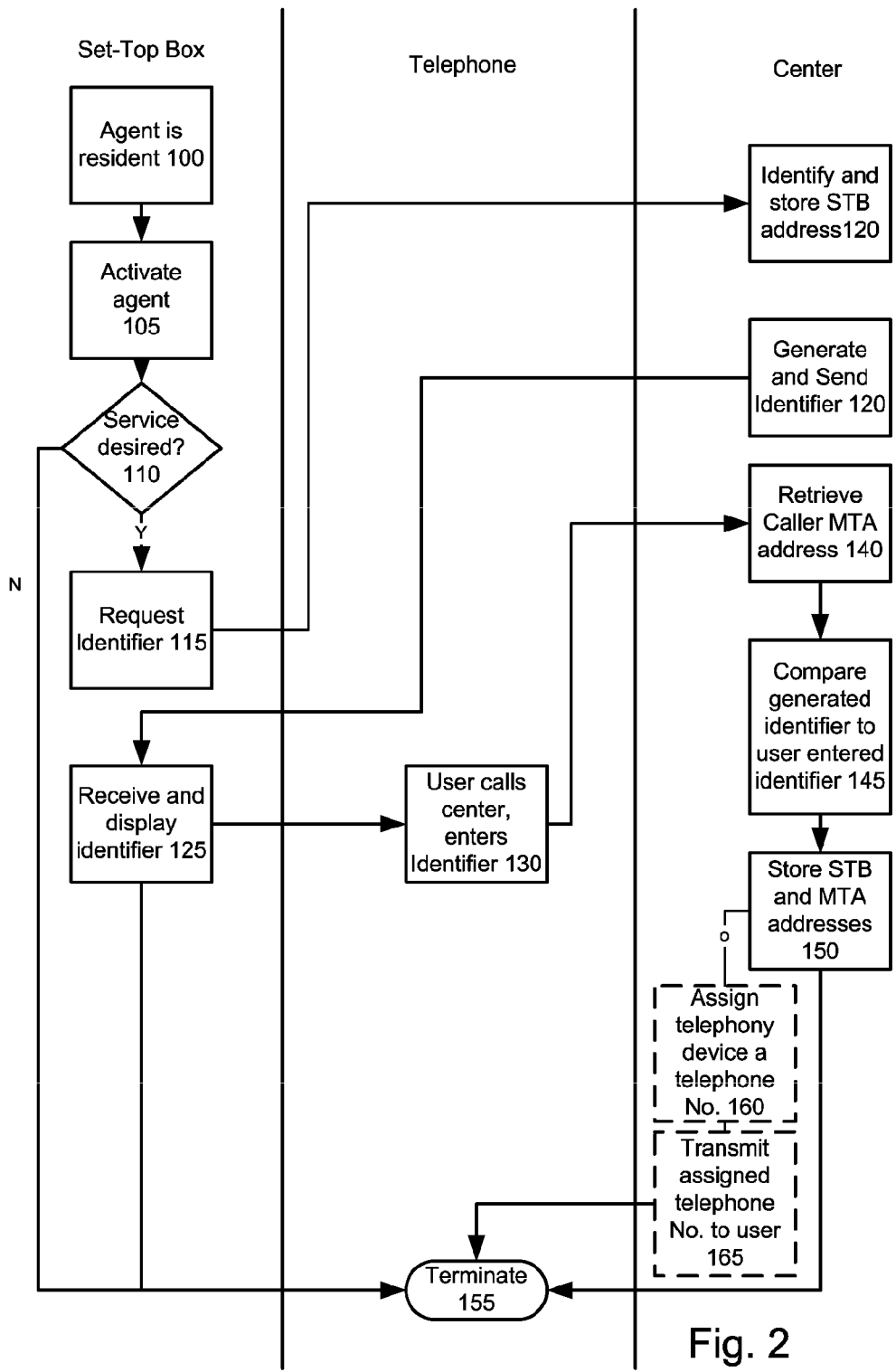
FIG. 2 depicts a simplified flow diagram for an aspect of the present invention.
Figure 3:
FIG. 3 depicts a sample screen proposing activation.

FIG. 2 is a simplified flow diagram of the operation of the preferred embodiment of the invention. The agent is made resident in the STB 100 by any desired method. When the agent is activated 105 it displays a message proposing to the user to 'activate' or otherwise register the desired services, such as telephony services, TV caller ID services, and the like. FIG. 3 contains an example of such message.

If the user does not desire the services, the process terminates as shown by the N arrow from the decision box depicted as 110. If however the user is interested, the client requests 115 an identifier from a server 20. The server is coupled to network 10 either directly or indirectly. The agent may include in the request an explicit identification of the initiating STB, or such identification may be derived by any other convenient means such as those common to communications between an STB and other nodes on the network such as for example a packet header.

The server generates and sends to the STB an identifier 120. The identifier may be selected by any convenient manner such as random number generation, selection from a list, hashing the STB number, using a counter, and the like. The identifier need not be long or complex as its lifespan is considered short—only until activation of the service is accomplished—but may be complex if so desired. However the server needs to verify that no two identifiers are identical within a pre-selected timeframe. Clearly, a never repeating identifier may be used, but this carries the disadvantage of having to deal with long number once a large number of users utilized the service. The server also stores the identifier and the associated STB identifier in a list of active identifiers, for later use.

Figure 4:
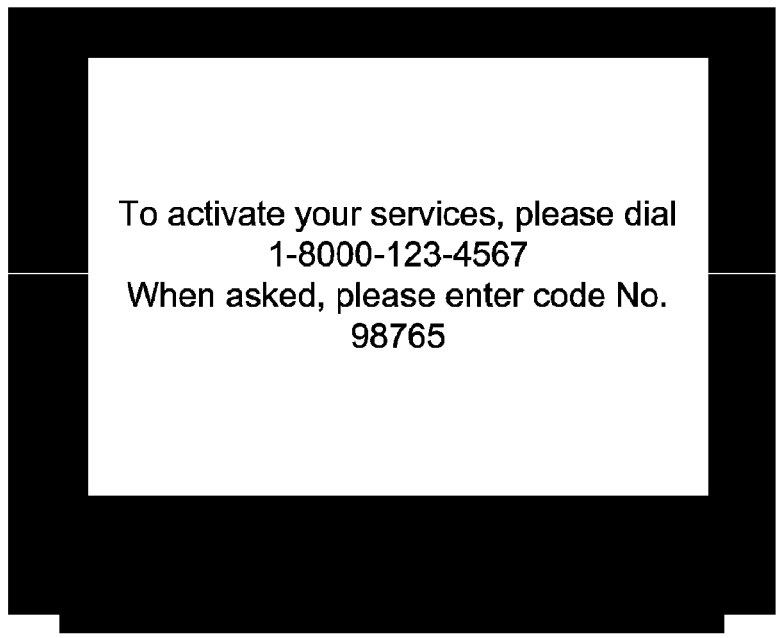
FIG. 4 depicts a sample instructions screen.

The STB receives the identifier and displays it to the user 125. Preferably a clear message such as the one depicted in FIG. 4 is used, instructing the user of the next steps. The user can then call the number provided 130 and transmit the identifier, for example by dialing, or voice. The server retrieves the Telephone identification 140 by any convenient means such as preferably by the packet header, a caller ID arrangement, or by querying the sending MTA or the telephone device. A less preferred method is to ask the user to provide the telephone number.

The server then uses the stored active identifiers list to match with the identifier entered by the user 145. It retrieves the STB identification associated with the associated stored identifier. The server stores 150 the STB identifier and the associated MTA identifier, preferably in a database, for future use. The agent software may then terminate 155 after accomplishing the required task.

Optionally, a telephone number may be assigned to the user 160. This may be useful for example in a first activation of a cable television based telephony service. In such a case, all MTA's default to contacting the server, and upon activation the server assigns the MTA a telephone number. The telephone number may then be sent to the user 165 by the telephone, or to the set-top box, for display on the screen. This optional step may be independently desired for verification that the correct telephone number has been associated with the correct television.

The invention is also useful for user self installation of MTA or telephone equipment or STB equipment. The method presented here also offers direct association and optionally verification by the end-user, which reduces the chance for errors.

It is noted again that the invention further extends to other devices such as cellular telephones being used as telephones and/or set-top boxes and display devices.

The order of the steps described and claimed herein will be recognized by the skilled in the art as a recommendation and other orders of executions may be utilized without departing from the scope of the invention. Similarly other intervening steps may be incorporated without departing from the scope of the invention. The server function may be distributed between a plurality of servers, and a plurality of networks or network types may be used, including different networks for coupling between the MTA, STB, and the server.

As mentioned above the invention is applicable to all manner of networks, as main distribution networks or with intervening networks such as wireless data networks, and wide area wireless network such as WiMAX (Worldwide Interoperability for Microwave Access) and similar terrestrial networks. In summary the invention is applicable to association between communications service interfaces.

It will be appreciated that the invention is not limited to what has been described hereinabove merely by way of example. While there have been described what are at present considered to be the preferred embodiments of this invention, it will be obvious to those skilled in the art that various other embodiments, changes, and modifications may be made therein without departing from the spirit or scope of this invention and that it is, therefore, aimed to cover all such changes and modifications as fall within the true spirit and scope of the invention, for which letters patent is applied.

What is claimed is:

1. A method for user assisted association between a television and a telephony device, the method comprising the steps of: receiving a code request from a set-top box having an address; selecting a code by at least one of generating a random number, selecting from a list, hashing the set-top box address, and generating the code using a counter; identifying the set-top box address automatically; associating the code with the set-top box address; sending a code to the set-top box, for displaying the code to a user, wherein displaying further comprises instructions for transmitting the code; receiving the code from a telephony device wherein transmitting further comprises at least one of entering the code on a keypad of the telephony device and speaking the code into the telephony device; having an address associated therewith and, identifying the telephony device address; using the code, associating the address of the set-top box with the address of the telephony device, wherein identifying the set-top box address automatically further comprises at least one selected from the group of: adapting the code request from the set-top box to contain the set-top box address and adapting the identifying step for detecting the set-top box address from the code request sent by the set-top box; adapting identifying the set-top box address by a Media Access Code address of the set-top box; adapting identifying the set-top box by an Internet Protocol address assigned to the set-top box; and, adapting identifying the set-top box by a combination of the Media Access Code address of the set-top box and an Internet Protocol address assigned to the set-top box, wherein the television and the telephony device are associated by user assistance.

2. A method for user assisted association between a television and a telephony device as claimed in claim 1 wherein the displayed code is transmitted by the user.

3. A method for user assisted association between a television and a telephony device as claimed in claim 1, wherein the telephony device is a private branch exchange, a central home gateway device, a cable modem or an Internet Protocol telephone device.

4. A method for user assisted association between a television and a telephony device as claimed in claim 1 wherein the step of identifying the telephony device address further comprises identifying a telephone number and is carried out automatically.

5. A method for user assisted association between a television and a telephony device as claimed in claim 4 wherein the step of identifying the telephony device address is carried out using a telephone caller identification method.

6. A method for user assisted association between a television and a telephony device as claimed in claim 1 wherein the address of the telephony device is a telephone number.

7. A method for user assisted association between a television and a telephony device as claimed in claim 1 further comprising the step of assigning the telephony device a telephone number.

8. A method for user assisted association between a television and a telephony device as claimed in claim 7 further comprising the step of transmitting the telephone number to the set-top box.

9. A method for user assisted association between a television and a telephony device as claimed in claim 7 further comprising the step of transmitting the telephone number to the telephony device.

10. A method for user assisted association between a television and a telephony device as claimed in claim 1 wherein the set-top box is embedded in a wireless device.

11. A method for user assisted association between a television and a telephony device as claimed in claim 1 wherein the set-top box is satellite television enabled.

12. A method for user assisted association between a television and a telephony device as claimed in claim 1 wherein the set-top box and the telephony device are coupled to a single distribution network.

13. A method for user assisted association between a television and a telephony device as claimed in claim 1 wherein the telephony device is a telephone.

14. A method for user assisted association between a television and a telephony device as claimed in claim 1 wherein the telephony device is a cellular telephone.

15. A method for user assisted association between a television and a telephony device as claimed in claim 1 wherein the telephony device is an MTA.

16. A method for user assisted association between a television and a telephony device, the method comprising the steps of: sending a code request from an addressable set-top box; wherein the code is selected by at least one of generating a random number, selecting from a list, hashing the set-top box address, and generating the code using a counter; receiving a code displaying the code to a user, wherein displaying further comprises instructions for transmitting the code; and having a user transmit the code utilizing an telephony device having an address associated therewith, for associating the set-top box wherein transmitting further comprises at least on of entering the code on a keypad of the telephony device and speaking the code into the telephony device and, with the telephony device, wherein sending further comprises detecting an address of the set-top box automatically by at least one selected from the group of: adapting the code request from the set-top box to contain the set-top box address and adapting detecting the set-top box address from the code request sent by the set-top box; adapting detecting the set-top box address by a Media Access Code address of the set-top box; adapting detecting the set-top box by an Internet Protocol address, assigned to the set-top box; and, adapting detecting the set-top box by a combination of the Media Access Code address of the set-top box and an Internet Protocol address assigned to the set-top box, wherein the television and the telephony device are associated by user assistance.

17. A method for user assisted association between a television and a telephony device as claimed in claim 16, wherein the set-top box is equipped with a software agent adapted to perform the steps of sending, receiving and displaying.

18. A method for user assisted association between a television and a telephony device as claimed in claim 17 wherein the software agent initiates the step of sending responsive to a user activation.

19. A method for user assisted association between a television and a telephony device as claimed in claim 17 wherein the software agent is activated automatically or remotely.

20. A method for user assisted association between a television and a telephony device as claimed in claim 16 wherein the telephony device is a telephone.

21. A method for user assisted association between a television and a telephony device as claimed in claim 16 wherein the telephony device is a cellular telephone.

22. A method for user assisted association between a television and a telephony device as claimed in claim 16 wherein the telephony device is a MTA.

23. A method for user assisted association between a television and a telephony device as claimed in claim 16 wherein the telephony device and the set-top box are coupled to a single distribution network.

24. A method for user assisted association between a television and a telephony device as claimed in claim 16 wherein the telephony device address is a telephone number.

25. A method for user assisted association between a television and a telephony device, the method comprising the steps of sending a code request from an addressable set-top box located at a user premises; in a server, identifying the set-top box address automatically; generating a code wherein generating further comprises selecting the code by at least one of, generating a random number, selecting from a list, hashing the set-top box address, and generating using a counter; associating the code with the set-top box address; and transmitting the code to the set-top box; displaying the code, wherein displaying further comprises instructions for transmitting the code; using a telephony device having an address associated therewith, transmitting the code to the server wherein transmitting further comprises at least one of entering the code on a keypad of the telephony device and speaking the code into the telephony device; at the server, identifying the telephony device address; and using the code, associating the telephony device with the set-top box, wherein identifying the set-top box address automatically further comprises at least one selected from the group of: adapting the code request from the set-top box to contain the set-top box address and adapting the identifying step for detecting the set-top box address from the code request sent by the set-top box; adapting identifying the set-top box address by a Media Access Code address of the set-top box; adapting identifying the set-top box by an Internet Protocol address assigned to the set-top box; and, adapting identifying the set-top box by a combination of the Media Access Code address of the set-top box and the Internet Protocol address assigned to the set-top box, wherein the television and the telephony device are associated by user assistance.

26. A method for user assisted association between a television and a telephony device as claimed in claim 25, wherein the telephony device is a private branch exchange, a central home gateway device, or an Internet Protocol telephone device.

27. A method for user assisted association between a television and a telephony device as claimed in claim 25 wherein the telephony device is a telephone.

28. A method for user assisted association between a television and a telephony device as claimed in claim 25 wherein the telephony device is a cellular telephone.

29. A method for user assisted association between a television and a telephony device as claimed in claim 25 wherein the telephony device is a MTA.

30. A method for user assisted association between a television and a telephony device as claimed in claim 25 wherein the telephony device and the set-top box are coupled to a single distribution network.

31. A method for user assisted association between a television and a telephony device as claimed in claim 30 wherein the distribution network is selected from a group consisting of a telephone network, an electrical distribution network, a data distribution network, a cable television distribution network, a wireless distribution network, a cellular distribution network, a satellite distribution network, and a terrestrial distribution network.

32. A method for user assisted association between a television and a telephony device as claimed in claim 25 wherein the step of identifying the telephone number is carried out automatically.

33. A method for user assisted association between a television and a telephony device as claimed in claim 32 wherein the step of identifying the telephony device address is earned out using a telephone caller identification method.

34. A method for user assisted association between a television and a telephony device as claimed in claim 25 wherein the address of the telephony device is a telephone number.

35. A method for user assisted association between a television and a telephony device as claimed in claim 25 wherein the set-top box is embedded in a wireless device.

36. A method for user assisted association between a television and a telephony device as claimed in claim 25 wherein the set-top box is satellite television enabled.

37. A method for user assisted association between a television and a telephony device as claimed in claim 25 wherein the step of sending further comprises the step of sending the address of the set-top box.

38. A method for user assisted association between a television and a telephony device as claimed in claim 25, wherein the set-top box is equipped with a software agent adapted to perform the steps of sending, receiving and displaying.

39. A method for user assisted association between a television and a telephony device as claimed in claim 38 wherein the software agent initiates the step of sending responsive to a user activation.

40. A method for user assisted association between a television and a telephony device as claimed in claim 38 wherein the software agent is activated automatically or remotely.

* * * * *

UNITED STATES PATENT AND TRADEMARK OFFICE
CERTIFICATE OF CORRECTION

PATENT NO. : 7,647,617 B2
APPLICATION NO. : 10/904552
DATED : January 12, 2010
INVENTOR(S) : Bartfeld et al.

It is certified that error appears in the above-identified patent and that said Letters Patent is hereby corrected as shown below:

Please delete claim 1, column 5, lines 25-54 and insert --A method for user assisted association between a television and a telephony device, the method comprising the steps of: receiving a code request from a set-top box having an address; identifying the set-top box address automatically; selecting a code by at least one of generating a random number, selecting from a list, hashing the set-top box address, and generating the code using a counter; associating the code with the set-top box address; sending the code to the set-top box, for displaying the code to a user, wherein displaying further comprises instructions for transmitting the code; receiving the code from a telephony device having an address associated therewith, wherein transmitting further comprises at least one of entering the code on a keypad of the telephony device and speaking the code into the telephony device; identifying the telephony device address; and, using the code, associating the address of the set-top box with the address of the telephony device, wherein identifying the set-top box address automatically further comprises at least one selected from the group of: adapting the code request from the set-top box to contain the set-top box address and adapting the identifying step for detecting the set-top box address from the code request sent by the set-top box; adapting identifying the set-top box address by a Media Access Code address of the set-top box; adapting identifying the set-top box by an Internet Protocol address assigned to the set-top box; and, adapting identifying the set-top box by a combination of the Media Access Code address of the set-top box and an Internet Protocol address assigned to the set-top box, wherein the television and the telephony device are associated by user assistance.--

Please delete claim 16, column 6, lines 40-65 and insert --A method for user assisted association between a television and a telephony device, the method comprising the steps of: sending a code request from an addressable set-top box; receiving a code, wherein the code is selected by at least one of generating a random number, selecting from a list, hashing the set-top box address, and generating the code using a counter; displaying the code to a user, wherein displaying further comprises instructions for transmitting the code; and, having a user transmit the code utilizing an telephony device having an address associated therewith, for associating the set-top box with the telephony device, wherein transmitting further comprises at least one of entering the code on a keypad of the telephony device and speaking the code into the telephony device and, wherein sending further comprises detecting an address of the set-top box automatically by at least one selected from the group of: adapting the code request from the set-top box to contain the set-top box address and adapting detecting the set-top box address from the code request sent by the set-top box; adapting detecting the set-top box address by a Media Access Code address of the set-top box; adapting detecting the set-top box by an Internet Protocol address, assigned to the set-top box; and, adapting detecting the set-top box by a combination of the Media Access Code address of the set-top box and an Internet Protocol address assigned to the set-top box, wherein the television and the telephony device are associated by user assistance.--

CERTIFICATE OF CORRECTION (continued)
U.S. Pat. No. 7,647,617 B2

Claim 33, column 8, line 31: delete "earned" and insert --carried--

Signed and Sealed this

Second Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,647,617 B2 Page 1 of 1
APPLICATION NO. : 10/904552
DATED : January 12, 2010
INVENTOR(S) : Bartfeld et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1247 days.

Signed and Sealed this

Sixteenth Day of November, 2010

David J. Kappos
*Director of the United States Patent and Trademark Office*